US006944688B1

(12) United States Patent
Batcher

(10) Patent No.: US 6,944,688 B1
(45) Date of Patent: \*Sep. 13, 2005

(54) QUEUING SYSTEM USING DUAL RECEIVE FIFO

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 429 days.

This patent is subject to a terminal disclaimer.

(21) Appl. No.: 09/861,149

(22) Filed: May 18, 2001

(51) Int. Cl.[7] .............................. G06F 3/00; G06F 5/00
(52) U.S. Cl. ............................. 710/55; 710/52; 710/54
(58) Field of Search ......................... 375/136; 380/44;
    370/342; 714/798; 713/193, 168; 455/21.1; H04L 29/06;
    710/52, 54, 55, 7, 57; 712/227

(56) References Cited

U.S. PATENT DOCUMENTS

| | | | | |
|---|---|---|---|---|
| 4,876,737 A | * | 10/1989 | Woodworth et al. | 455/12.1 |
| 5,235,641 A | * | 8/1993 | Nozawa et al. | 713/193 |
| 5,668,880 A | * | 9/1997 | Alajajian | 370/342 |
| 5,742,623 A | * | 4/1998 | Nuber et al. | 714/798 |
| 5,828,693 A | * | 10/1998 | Mays et al. | 375/136 |
| 6,215,873 B1 | * | 4/2001 | Dillon et al. | 380/44 |
| 6,275,588 B1 | * | 8/2001 | Videcrantz et al. | 713/168 |
| 6,643,719 B1 | * | 11/2003 | Baker | 710/57 |
| 6,775,764 B1 | * | 8/2004 | Batcher | 712/227 |

FOREIGN PATENT DOCUMENTS

EP            000582395 A2  *  7/1993  ........... H04L 29/06

* cited by examiner

Primary Examiner—Jeffrey Gaffin
Assistant Examiner—Joshua D. Schneider
(74) Attorney, Agent, or Firm—Tucker Ellis & West LLP

(57) ABSTRACT

A queuing system utilizing dual first-in, first-out (FIFO) memories is provided. The present queuing system is configured to use a first FIFO memory to receive and transfer a plurality of frames to a second FIFO memory wherein the frames include encrypted frame contents. The first FIFO memory is configured to transfer an interrupt to an associated processor in response to completion of the receipt of a valid frame. Next, the processor is configured to reinitialize the first FIFO memory for receipt of a subsequent frame. Additionally, the second FIFO memory is suitably adapted to concurrently store a plurality of frames transferred from the first FIFO memory. Finally, the present system is configured to transfer one of the stored frames out of the second FIFO memory in response to the completion of a data processing operation (e.g. initialization of a decryption algorithm).

34 Claims, 5 Drawing Sheets

QUEUING SYSTEM USING DUAL RECEIVE FIFO

FIELD OF INVENTION

The present invention generally relates to a queuing system, and more particularly to a queuing system using a plurality of interconnected memory devices to queue data associated with data processing operations having different rates.

BACKGROUND OF THE INVENTION

In a typical wireless local area network (WLAN) configuration, a portable or mobile device (e.g., a laptop personal computer) normally includes a HOST processor and a PCI card or PCMCIA card. On this card resides a Medium Access Control (MAC) processing system, a PHY (physical layer) processing device (e.g., a digital signal processor), and a main memory. The MAC processing system includes a MAC processor (e.g., an embedded processor), which is a multi-functional processor engine responsible for a variety of different processing tasks associated with the wireless communications. The PHY processing device performs such functions as encoding/decoding waveforms. For privacy, data transferred between the PHY processing device and the MAC processing system (i.e., the PHY data stream) may be encrypted using an encryption algorithm, including, but not limited to: RC4, DES (Data Encryption Standard) and AES (Advanced Encryption Standard). Consequently, encrypted data received by the MAC processing system from the PHY processing device must be subsequently decrypted.

Similarly, in the case of a data transmission from the MAC processor to the PHY data processing device, the data originates from the HOST processor that writes the data as plaintext to the main memory. The MAC processor will at a later time read the data from the main memory and encrypt it, using an encryption algorithm. Then, the encrypted data is transmitted to the PHY processing device.

It should be appreciated that encryption algorithms typically require the use of a private key to ensure data security. One of the significant time consuming steps in decrypting data is searching memory to look up a private key associated with an incoming receive address and then initializing a table (using this private key) for use in a decryption algorithm (e.g., RC4). Often times, there are many clients communicating with a station, thus the database may be quite large having thousands of entries each with possibly different keys.

It is widely recognized that wireless communications protocols, such as IEEE 802.11, are highly demanding on the throughput requirements of modern day systems. Commonly, application specific integrated circuits (ASICS) with embedded processors are needed in order to provide enough computing power to meet the requirements. One problem at the MAC layer with meeting the IEEE 802.11 timing requirements is the turn around time between frames. In accordance with IEEE 802.11, the time interval between frames is known as the "interframe space" (IFS). Four different IFSs are defined to provide priority levels for access to a wireless media (listed in order, from the shortest to the longest): (a) SIFS short interframe space; (b) PIFS PCF interframe space; (c) DIFS DCF interframe space; and (d) EIFS extended interframe space.

In a receive scenario, where a communication device, such as a station or access point, receives back-to-back encrypted frames, meeting the 10 µs SIFS ("short interframe space") time requirement is difficult. This is due to the need to finish processing of the decrypted frame before the next one arrives. Furthermore, with the advent of the 802.11a protocol, the SIFS time is even less, typically 6–8 microseconds due to PHY delay associated with OFDM latency.

FIG. 1 illustrates an exemplary data stream from the PHY to the MAC processor. A typical data stream includes a plurality of frames (also referred to as "packets) separated by an interframe gap. Each frame is a collection of bytes that comprise a single message being transferred between the PHY and MAC processor. A typical frame may include a header (including an initialization vector (IV) and an integrity check vector (ICV)), one to several thousand bytes of encrypted data (also referred to as "ciphertext"), checksum data, as well as other information. The contents of a frame is referred to herein as the "frame content."

In the exemplary embodiment, the IV portion of the header is used to partition frames between the header and the encrypted ciphertext, and also provides a portion of a lookup key for decryption. In this regard, the IV portion includes 3 bytes of a 16 byte private key, which is needed before initialization of a decryption state table (RC4) can commence. Therefore, the decryption processing cannot begin until the IV portion of the frame has arrived. The ICV portion is used to authenticate the source of received data. It should be understood that the time to load the key and prepare the encryption table is unaffected by the frame size. Thus, it will take about the same amount of time (e.g., 20 microseconds) to initialize an RC4 state table, regardless of the size of the frame. Moreover, the time for performing a key lookup is independent of the frame size.

A worst case timing scenario occurs when a short frame (i.e., a frame having relatively few bytes (e.g., 10–20 bytes of data) arrives at a station followed by another frame. If the key lookup and decryption processing take too long, a station will be unable to complete decryption processing before the next packet arrives. A lag effect will always occur where the receiving memory storage device accumulates ciphertext bytes before they are decrypted following complete initialization of a decryption table (RC4). If this lag effect is significant, an "overrun" situation may arise where the FIFO will completely fill up causing received data to be lost.

In order to meet the timing demands, prior art systems have commonly employed FIFO memories to queue up and receive a frame as it arrives so it can be processed later. FIFOs are also referred to herein as queues. It should be appreciated that this technique may only delay an overrun situation. In this regard, it is necessary for the "traffic density" of a queuing system (also known as a "queuing network") to be less than 1, in order for it to be mathematically stable. Traffic density is defined as: "arrival rate into the queue" divided by "departure rate out of the queue." Thus, without decryption throughput to process the queue comparable to the PHY data throughput of the arriving data, an overrun situation is inevitable as more and more packets arrive.

Another prior art approach has been to offload the decryption processing for a later time. In this regard, decryption processing becomes decoupled from a receive operation. Thus, a receive operation will only receive ciphertext, store it into memory, and leave decryption for later. However, this approach requires extra firmware processing and buffer space to store several frames of data. Also, since the frames are not processed in real time, it will take longer to authenticate the data and then offload it to the host. This long latency time is not desirable for applications related to quality of service (e.g., streaming voice and video) where it is important to minimize packet processing latency between the PHY and Host.

The present invention addresses these and other drawbacks of the prior art.

SUMMARY OF THE INVENTION

According to the present invention there is provided a queuing system comprising: a first FIFO memory for receiving frames comprised of frame contents, wherein said first FIFO memory transmits an interrupt to an associated processor in response to completing receipt of a frame, said processor re-initializing said first FIFO memory for receipt of a subsequent frame; and a second FIFO memory for receiving frame contents from the first FIFO memory.

According to another aspect of the present invention there is provided a queuing system comprising: first memory means for receiving frames comprised of frame contents, wherein said first memory means transmits an interrupt to an associated processing means in response to completing receipt of a frame, said processor re-initializing said first memory means for receipt of a subsequent frame; and second memory means for receiving frame contents from the first memory means.

According to yet another aspect of the present invention there is provided a queuing method comprising: writing frames comprised of frame contents into a first memory, wherein said first memory transmits an interrupt to an associated processor in response to completing receipt of a frame; re-initializing said first FIFO memory for receipt of a subsequent frame in response to the interrupt; and transferring frame contents from the first memory to a second memory.

An advantage of the present invention is the provision of a queuing system which provides improved data throughput.

Another advantage of the present invention is the provision of a queuing system which provides greater efficiencies in data processing.

Still another advantage of the present invention is the provision of a queuing system wherein the overhead associated with memory read/write operations is minimized.

Still another advantage of the present invention is the provision of a queuing system which compensates for lag time associated with a decryption process.

Still another advantage of the present invention is the provision of a queuing system which can efficiently receive and process short back-to-back data frames.

Yet another advantage of the present invention is the provision of a queuing system which allows for "pipelining" of received frames of data.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
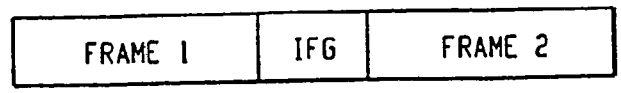
FIG. 1 illustrates an exemplary data stream transferred between the PHY and the MAC processor.
Figure 2:
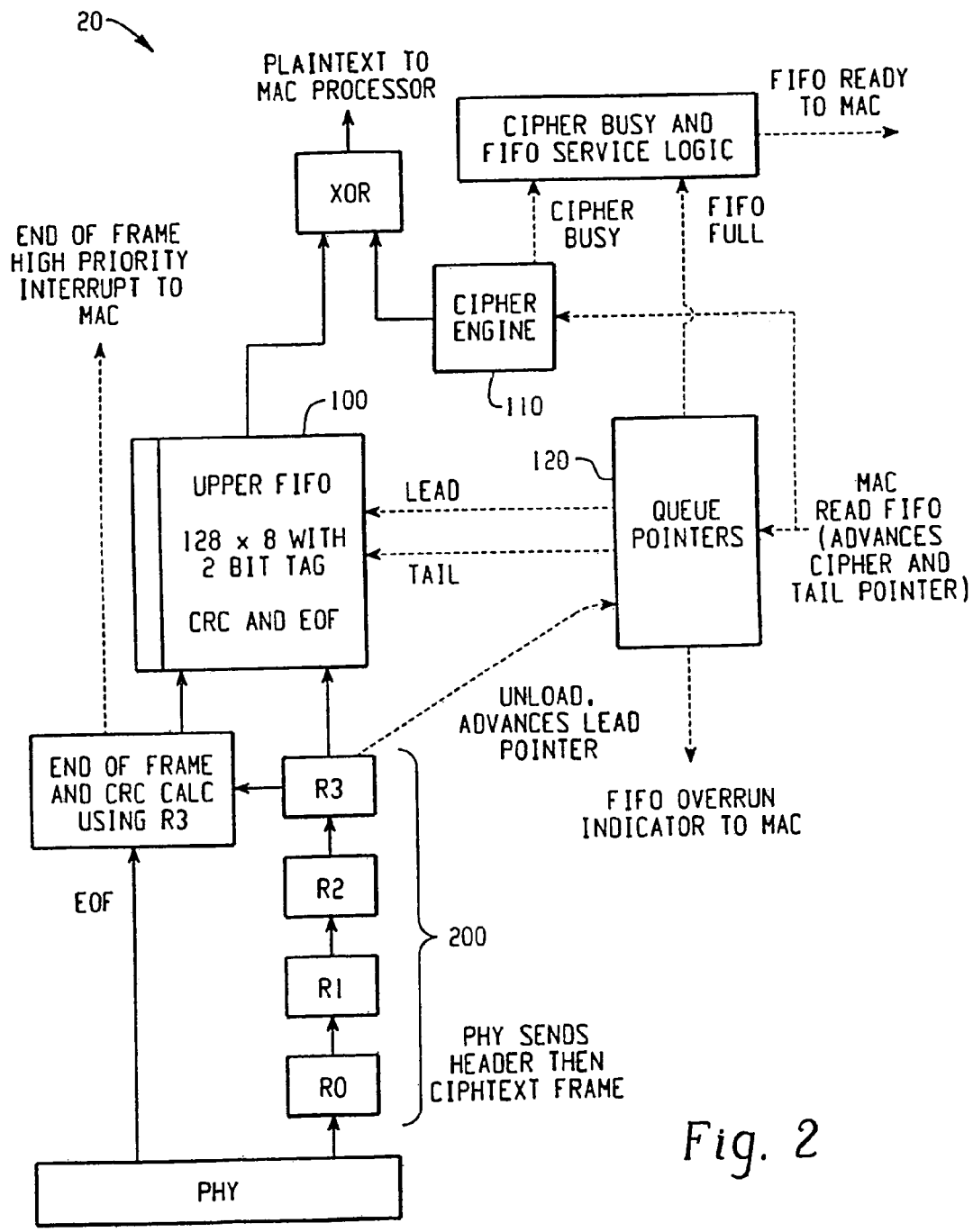
FIG. 2 shows a queuing system including upper and lower FIFOs, according to a preferred embodiment of the present invention

Referring now to the drawings wherein the showings are for the purposes of illustrating a preferred embodiment of the invention only and not for purposes of limiting same, FIG. 2 shows a "receive path" block diagram of a queuing system 20 including a two-stage FIFO, in accordance with a preferred embodiment of the present invention. The two-stage FIFO is generally comprised of an upper FIFO memory 100 and a lower FIFO memory 200. Lower FIFO memory 200 will be explained in greater detail below. It should be appreciated that the rate at which data is transferred to lower FIFO memory 200 will at times be higher than the rate of a data decryption. This is caused by the initialization process of the cipher engine during which time the upper FIFO is effectively stalled. Therefore, queuing system 20 queues data associated with these data processing operations of differing rates.

In accordance with a preferred embodiment, lower FIFO 200 stores 4 bytes of data (e.g., received data in the form of ciphertext shifted in from a PHY interface), while upper FIFO 100 is an "extended" memory which stores 128 bytes of data. It should be appreciated that the noted FIFO sizes have been selected solely for purpose of illustrating a preferred embodiment of the present invention, and not for the purpose of limiting same.

RX queue pointers 120 are used to track the location of the bytes stored in upper FIFO 100. For example, pointers 120 may take the form of "head" and "tail" pointers which respectively point to the oldest byte received by upper FIFO 100, and the newest byte received by upper FIFO 100, or vice versa. One of the two pointers (i.e., the "lead pointer") will advance when a new byte is read into upper FIFO 100. It should be appreciated that other well known methods may be suitably employed to track the location of data stored in upper FIFO 100.

The cipher engine 110 enables the data read out of upper FIFO 100 to be automatically decrypted. In accordance with a preferred embodiment of the present invention, XOR data from a stream cipher engine (e.g. RC4) is used to unscramble the data and recover the plaintext from the ciphertext. Accordingly, the cipher engine 110 runs in lock step with the data processing of upper FIFO 100 once the cipher engine has completed initialization and key loading. Therefore, as soon as the cipher engine is ready, it enables the FIFO ready signal to the MAC processor which enables the MAC processor to read the data and advance the FIFO tail pointer. Internally, the cipher engine 110 will also advance the key stream needed for data decryption each time the MAC processor reads the FIFO data. Therefore, when the MAC processor reads the FIFO, the tail queue pointer 120 will advance as well as the cipher engine. Although shown in this embodiment with a stream cipher, the same invention can be applied to other block ciphers, such as those used for AES and DES.

Lower FIFO 200 is generally comprised of a plurality of shift registers R0–R3, and a CRC check register. R0–R3 preferably take the form of banks of flip-flops. Each register stores 1-byte, thus the illustrated FIFO 200 is a 4-byte FIFO. Data input to register R0 is received from the PHY, and may be input in parallel or serial. Data is shifted out of register R0 in parallel to registers R1–R3. Data propagates from R0 through R1 and R2 to R3, and on to upper FIFO 100. CRC register checks for valid data and outputs a signal to upper FIFO 100 indicative of the data validity. It should be appreciated that the receive data clock (from the PHY) runs at a considerably slower speed than the MAC clock for the lower FIFO 200. For example, the PHY clock may run at approximately 20 MHz, while the MAC clock runs at 88 MHz. Therefore, data will propagate through registers R0–R3 much faster than data is received from the PHY.

With regard to operation of lower FIFO 200, the first byte of data received at register R0 will have propagated to register R3, or out to upper FIFO 100 by the time the second byte of data is received at register R0. It should be further understood that lower FIFO 200 is synchronized with the current frame transmitted by the PHY. Furthermore, using information from the PHY (e.g. an end of frame indication on the last byte) and from the CRC field, the MAC processor determines how many bytes of data are to be received in each frame and if the data received has no errors. This information is used to determine when a complete frame has been received through lower FIFO 200. As the last byte propagates from lower FIFO 200 to upper FIFO 100, it is tagged with an end of frame delimiter (from the PHY) and CRCOK indication generated in the lower FIFO 200.

It should be understood that in a corresponding "transmit" path, the encryption process is automated as data is transmitted to the PHY. In a transmit scenario, there is no 'lag affect' since the MAC processor directly controls the PHY when it is sending data. However, after cipher engine initialization and key loading, efficient automated encryption is performed without any extra encryption processing by the MAC processor. As will be appreciated by those skilled in the art, the "receive" operation has much more stringent turn around time and throughput requirements than the "transmit operation."

In a receive operation, data (i.e., ciphertext) is shifted into upper FIFO 100 from lower FIFO 200. The output of upper FIFO 100 is decrypted using cipher engine 110, wherein as bytes are read out from upper FIFO 100, they are automatically decrypted using cipher engine (automated fast decrypt logic) 110 before being received by a processor. Therefore, to the processor, decryption is totally hidden, and thus all bytes read out from upper FIFO 100 are received as plaintext, thus requiring no post processing to decrypt.

With reception of packets, the present invention also addresses the need to recover from the "lag effect" where bytes are queued up by a station. As noted above, if it takes too long to prepare for decryption processing, it may not be possible to meet the SIFS (interframe gap) time requirement. Normally, if the SIFS time requirement is not met, subsequent packets are dropped until the station can recover and finish off the first frame. This is not desirable, especially with streaming data (which is becoming a common application with video, audio and voice communications).

Figure 4:
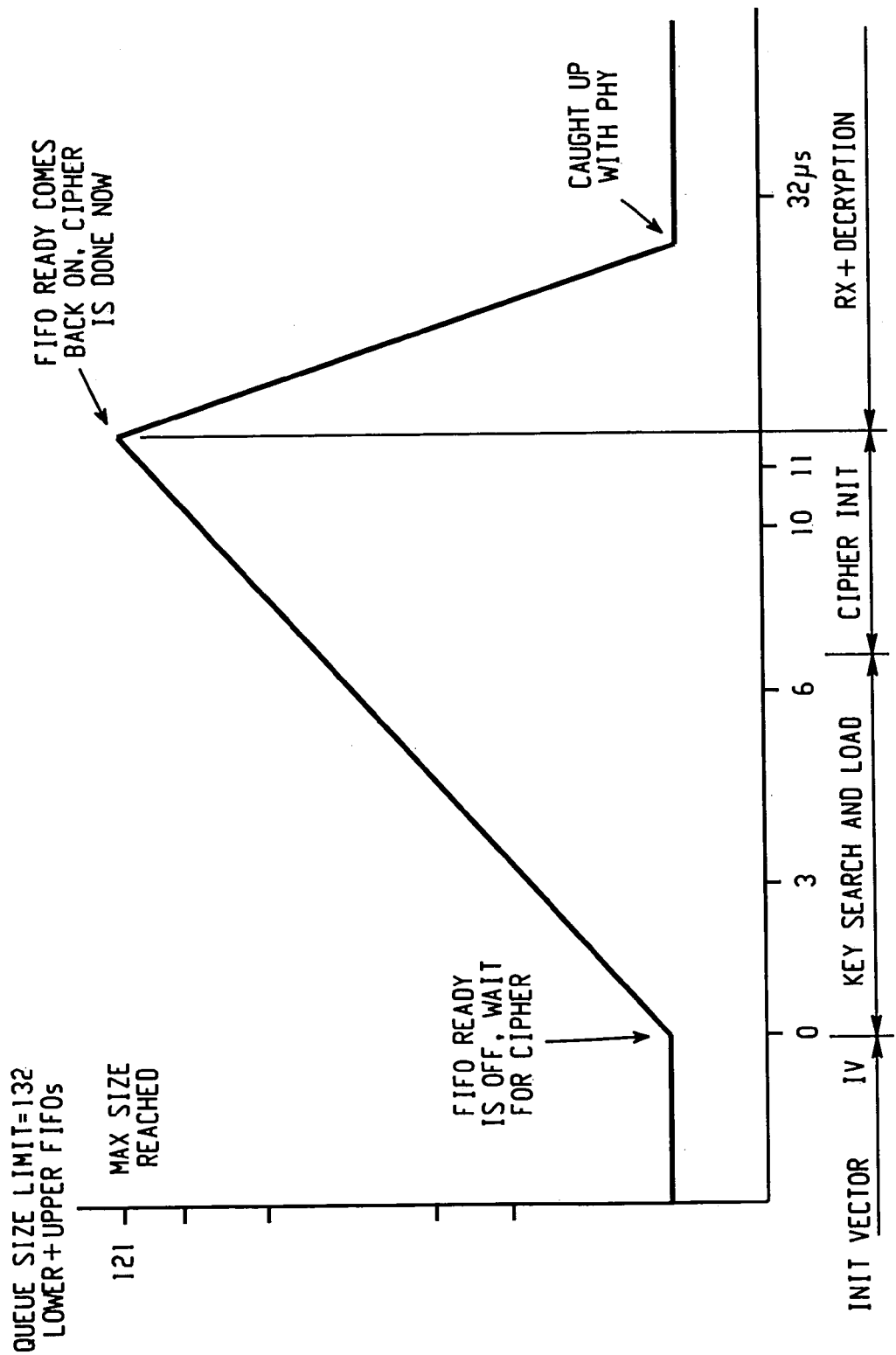
FIG. 4 is an exemplary timing diagram illustrating the dynamic FIFO operation associated with the decryption process.

For example, FIG. 4 illustrates a situation where a queue (e.g., FIFOs 200 and 100) begin to fill with bytes of data after initialization vector (IV) is received. Prior to this event, the plaintext (unencrypted) header is processed from lower FIFO 200 to upper FIFO 100 without interruption. Once the ciphertext begins, FIFOs 200 and 100 will continue to fill until the decryption table has been initialized, and decryption can begin. In the example shown in FIG. 4, the queue does not begin to empty until 11 microseconds has elapsed after the last byte of the header. Thereafter, it takes an additional 21 microseconds to completely empty the queue. It is important to note that bytes will continue to arrive from the PHY as cipher engine 110 associated with upper FIFO 100 is decrypting data. Thus, in this example, it takes a full 32 microseconds to empty the queue and "catch up". The receiving station will eventually catch up since the traffic density of the queuing network is less than one due to the efficiency of the present invention.

It should be appreciated that when the interframe gap is only 10 microseconds long, and if the frame is very short, there will be insufficient time to decrypt the data of an earlier received frame before a subsequent frame is received. Even at high data rates, for large frames (e.g. greater than 100 bytes) this is not a problem since the lag effect can be recovered before the end of the packet. This is made possible due to the high rate of decryption processing of the current invention which allows encrypted data to be processed out of FIFO 100 much faster than the arrival rate of data from the PHY. Thus, if a frame is large enough, a station can recover from the "lag effect" before a subsequent frame is received. Accordingly, given enough time, the receiving station will eventually "catch up."

Queuing system 20 allows for "piggy backing" of receive operations. In this regard, successive short frames can be overlapped (i.e., pipelined) as they are received by the station from the PHY. This is accomplished by "decoupling" lower FIFO 200 from upper FIFO 100. In this regard, the processor can begin processing a first decrypted frame ("frame 1"), and a code thread is dedicated to the task of performing the private key load, initialization for the decryption algorithm (e.g., RC4), and then processing the decrypted data out of the FIFO for frame 1. When lower FIFO 200 has received the "end of a frame" indicator (from the PHY) and CRC check, it signals the processor by sending a hardware high priority interrupt, which in turn invokes a high priority code thread, preempting other tasks done by the MAC processor. This hardware high priority interrupt informs the processor to prepare for the next upcoming frame, since the current frame has been received. Therefore, the high priority code thread can perform all the necessary actions to initialize the lower FIFO and send commands to the PHY and other radio components so a new receive can happen. These actions take less than 1 us and hence can complete during the interframe gap.

Figure 3:
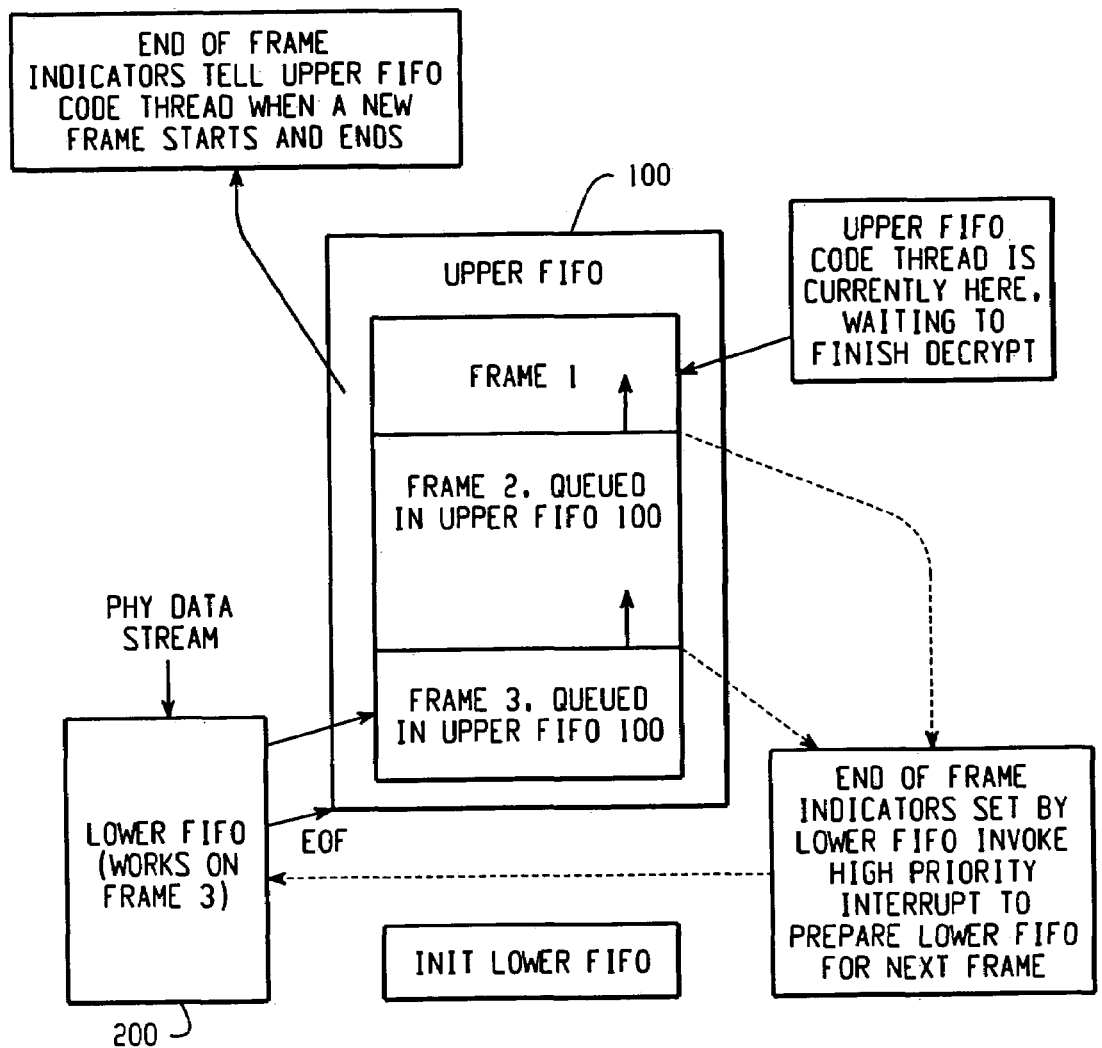
FIG. 3 illustrates the data flow of the queuing system according to a preferred embodiment of the present invention.

The high priority code thread quickly resets (i.e., initializes) lower FIFO 200 for receipt of the next frame. The contents of upper FIFO 100 are totally unaffected by this action, as is the code thread that is currently blocked, waiting for decrypt to finish on frame 1. Therefore, processing of the first frame (i.e., frame 1) can continue while the higher priority thread is running. Therefore, the turnaround time requirements for the receive are done by the high priority code thread which is uncoupled from the lower priority code thread doing the data processing of frame 1. Upper FIFO 100 will absorb the second frame (i.e., frame 2) and even additional frames (e.g., frame 3) until the first frame (frame 1) finishes and unblocks the code thread processing frame 1 (see FIG. 3). Therefore, no data is lost even if the interframe gap time is seriously missed, even to the point of not being done before a $2^{nd}$, $3^{rd}$, etc frame arrives. FIG. 3 provides a summary of the cooperative operations performed by the upper and lower FIFOs for this receive scenario.

In addition to turnaround time issues, throughput issues are addressed by using the automated decryption logic hardware which ensures the traffic density is below 1, even for the highest IEEE 802.11 data rates. However, as indicated above, this problem only manifests itself with short frames, because in such cases there is not enough time to recover from the "lag effect" and amortize the time needed for key lookup and decryption table initialization, since the frame is so short. Thus, a relatively small amount of data (e.g., 10 to 20 bytes) needs to be stored in the FIFOs hence many short packets can be absorbed. In contrast, with large frames there is no "lag effect" at all since there is enough time to finish the decrypt before the end of the frame as previously described.

Figure 5A:
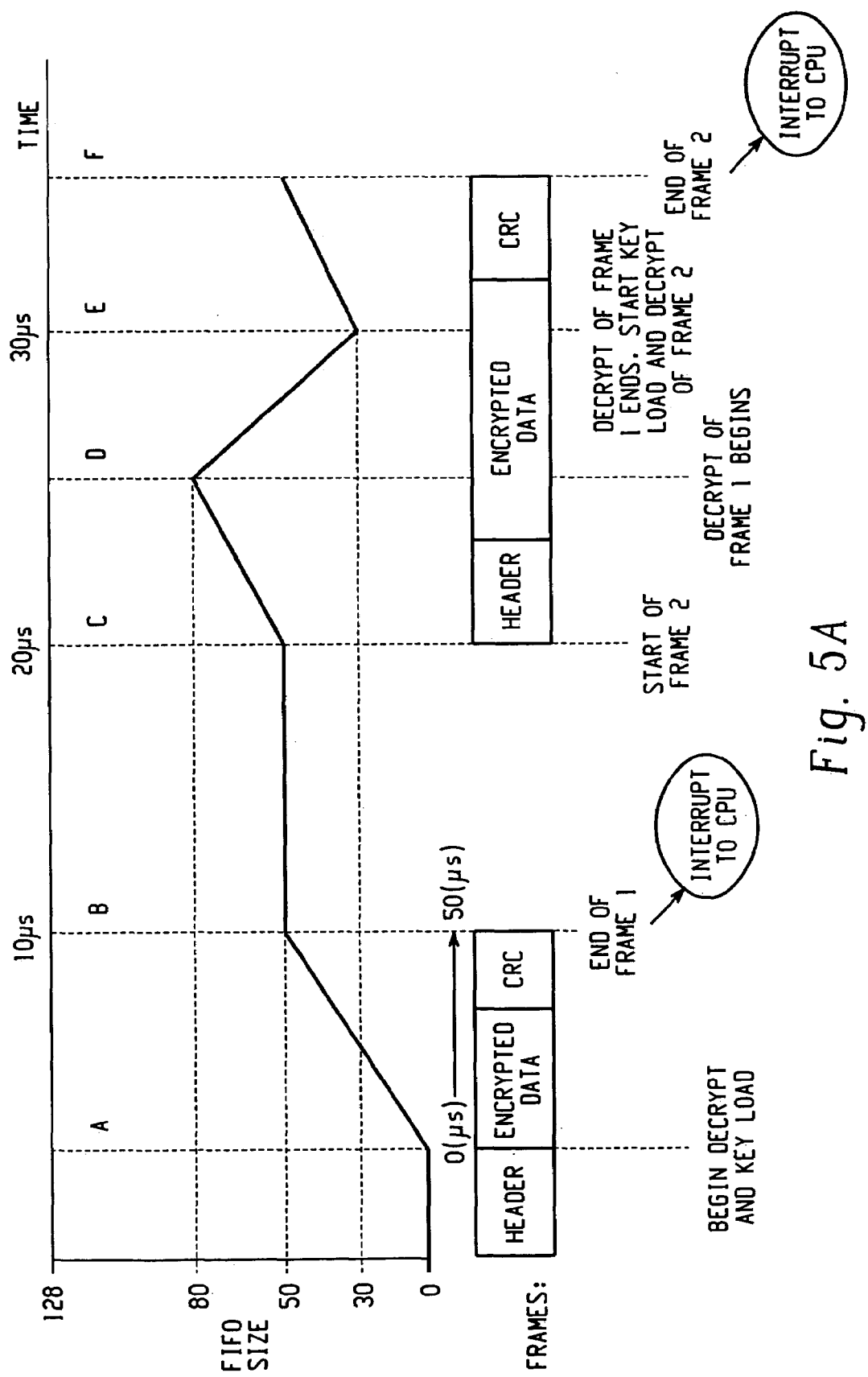
FIGS. 5A and 5B illustrate the processing of back-to-back short receive frames, in accordance with a preferred embodiment of the present invention.
Figure 5B:
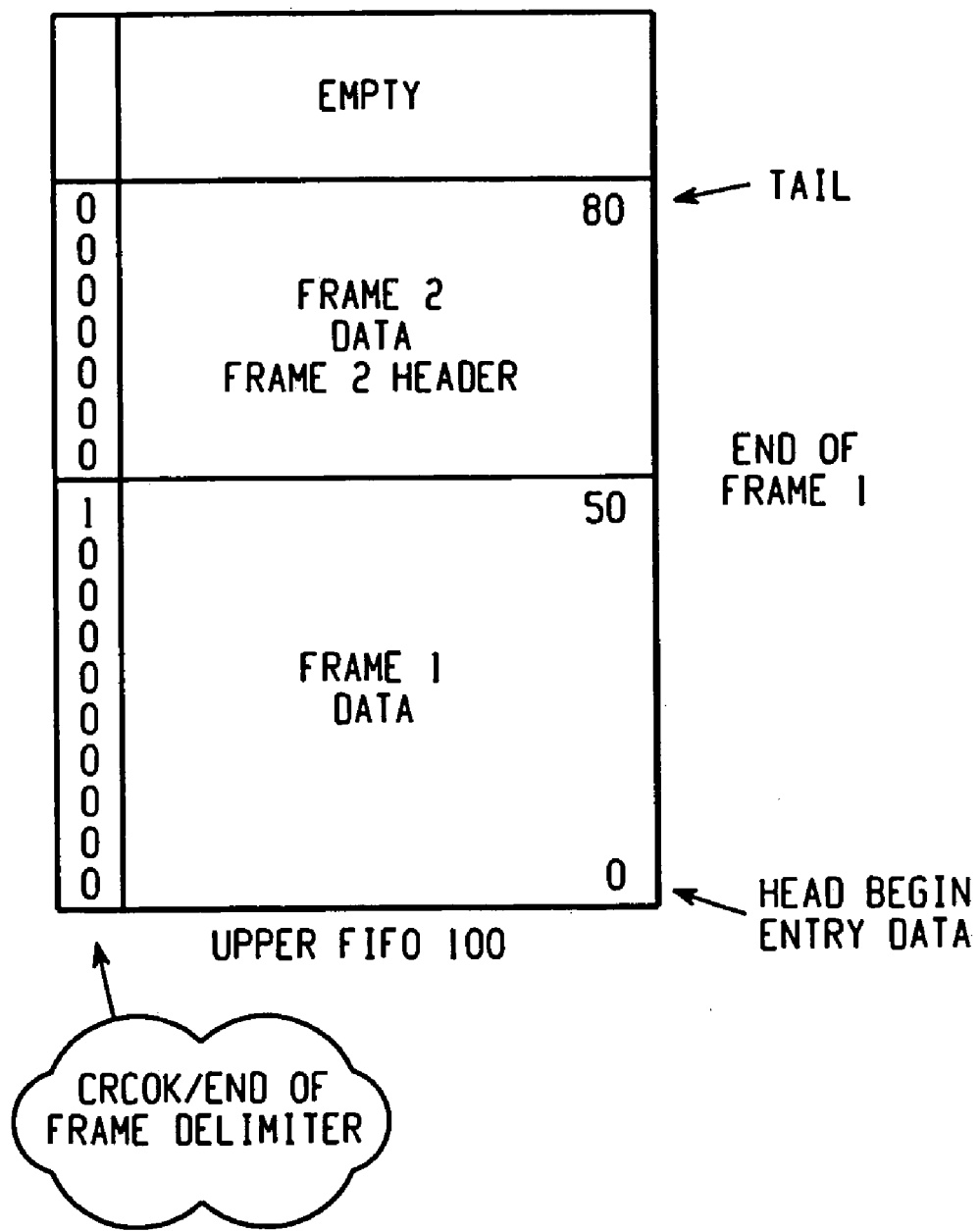

FIGS. 5A and 5B illustrate a scenario where two short packets are received back-to-back. FIG. 5A provides a diagram that shows FIFO size vs. time (not to scale), and two representative frames comprised of a header and encrypted data with a CRC. FIG. 5B illustrates the contents of upper FIFO 100. When the header arrives for the first frame (frame 1) it is processed straight away and the upper FIFO 100 does not accumulate any extra data. After the last byte of the header portion is received and stored to upper FIFO 100, the IV portion of the header is processed, thus beginning a key lookup process followed by initialization for decryption. Starting at time A, upper FIFO 100 accumulates data from the encrypted data body of frame 1 while waiting for decrypt to finish. This continues for the duration of the receive of frame 1 until time B, when the last data byte of the encrypted data body of frame 1 is received from the PHY. This last byte is identified in upper FIFO 100 by tagging an extra data bit of the last byte. This tag serves as a frame delimiter flag. For example, the last bit of byte "50" shown in FIG. 5B is set to "1" to provide a delimiter of frame 1. Furthermore, this tag (or an additional tag) may also serve as a flag indicative of frame validity.

At time B, a high priority hardware interrupt to the processor is also generated, which in turn prepares the PHY and lower FIFO 200 to accept an upcoming frame. This can be accomplished in less than 1 μs as previously stated. Meanwhile, the initialization for decryption of frame 1 continues. At time C a new frame (i.e., frame 2) arrives with a header and encrypted data body. This is stored from the lower FIFO 200 into the upper FIFO 100. Bytes again begin to accumulate until time D. At time D the initialization of the frame 1 decryption is completed and the frame 1 plaintext can be read out of upper FIFO 100 by the processor. The state of upper FIFO 100 is illustrated in FIG. 5B, at time D, as having 80 bytes delimited between frames 1 and 2.

After time D, new bytes from frame 2 continue to arrive, but since the processing rate (i.e., read out of FIFO 100 and decrypt) exceeds that of the PHY, there is a net decrease in FIFO size until time E. Just prior to time E the decrypt of frame 1 is complete and the upper FIFO code thread begins to process the frame 2 header which it does straight away. Like the previous frame, a decrypt initialization for frame 2 starts at time E, and therefore ciphertext begins to accumulate for frame 2. This continues until time F where the final byte of frame 2 is received from the PHY with the delimiter.

In accordance with the queuing system of the present invention, frames are pipelined, where lower FIFO 200 is throttled by the PHY data rate and upper FIFO 100 is throttled by the automated decryption-processing rate. Therefore, when upper FIFO 100 is paused waiting for the cipher engine, lower FIFO 200 will not be affected. Therefore, by decoupling the two FIFOs between frames, it is possible to receive a different packet from the PHY compared to the one being automatically decrypted in upper FIFO 100. A hardware interrupt allows two different code threads to cooperate on frame processing. The first code thread is concerned with lower FIFO 200, while the second code thread is concerned with upper FIFO 100. The present invention prevents the second frame from being dropped at point C as it would be in prior art approaches, since there is no pipeline processing of frames.

It should be appreciated that while a preferred embodiment of the present invention has been described in connection with a queuing system for addressing a "lag effect" associated with a decryption operation, it is contemplated by the inventor that the queuing system of the present invention is also suitably used to address a "lag effect" associated with other data processing operations.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A queuing system comprising:
    a first FIFO memory for receiving a frames comprised of a header and encrypted frame contents;
    a second FIFO memory for receiving the header and encrypted frame contents from the first FIFO memory, wherein the second FIFO is adapted to concurrently store a plurality of frames; and
    a stream cipher engine for decrypting the encrypted frame contents stored in the second FIFO memory; and
    wherein the frame propagates through the first FIFO to the second FIFO while it is being received;
    wherein after a portion of the header that includes data indicative of a lookup key for the frame is processed by the first FIFO memory and while at least a portion of the frame contents is being propagated from the first FIFO memory to the second FIFO memory, the stream cipher engine responsive to the data indicative of a lookup key performs a key lookup to decrypt the frame.

2. A queuing system according to claim 1, wherein said encrypted frame contents are read out of the second FIFO in response to completion of a data processing operation.

3. A queuing system according to claim 2, wherein said data processing operation includes initialization of a decryption algorithm.

4. A queuing system according to claim 3, wherein the frame contents that are encrypted are decrypted as read out of the second FIFO memory.

5. A queuing system according to claim 2, wherein the encrypted frame contents are periodically received by said first FIFO memory at a rate that is higher than the rate of the data processing operation.

6. A queuing system according to claim 1, wherein said first FIFO memory is smaller in size than said second FIFO memory.

7. A queuing system according to claim 1, wherein said second FIFO memory stores identifier data for identifying frame content associated with the end of a frame.

8. A queuing system according to claim 1, wherein a key is identified and a decryption algorithm is initialized for each frame in order to perform decryption of encrypted frame content, wherein said key is identified using a header portion of a frame.

9. A queuing system according to claim 1, wherein said second FIFO memory stores a flag indicative of at least one of: end of a frame and frame validity.

10. The queuing system of claim 1, further comprising a processor receiving the decrypted contents from the cipher engine.

11. The queuing system of claim 10, wherein the cipher engine sends a signal to the processor once it has completed initialization and key loading.

12. The queuing system of claim 11, wherein the processor retrieves the frame from the cipher engine responsive to the signal from the cipher engine.

13. The queuing system of claim 1, further comprising a CRC register for performing a data validity check for received frames, wherein the CRC register outputs signal to the second FIFO indicative the validity of the frame.

14. The queuing system of claim 13, wherein said first FIFO memory transmits an interrupt to the processor in response to completing receipt of a valid frame, said processor re-initializing said first FIFO memory for receipt of a subsequent.

15. The queuing system of claim 14, wherein the interrupt is a high priority interrupt that preempts other processes.

16. The queuing system of claim 15, wherein processing of first frame continues even while the interrupt is being processed.

17. A queuing system comprising:
a register for performing a data validity check for received frames;
first memory means for receiving frames comprised of a header and encrypted frame contents, wherein said first memory means transmits an interrupt to an associated processing means in response to completing receipt of a valid frame, said processor re-initializing said first memory means for receipt of a subsequent frame;
second memory means for receiving the encrypted frame contents from the first memory means wherein the second memory means is adapted to concurrently store a plurality of frames; and
a stream cipher engine for decrypting the encrypted frame contents received from the second memory means in response to the data validity check;
wherein after a portion of the header that includes data indicative of a lookup key for the frame is processed by the first memory means and while at least a portion of the frame contents is being propagated from the first memory means to the second memory means, the stream cipher engine responsive to the data indicative of a lookup key performs a key lookup to decrypt the frame.

18. A queuing system according to claim 17, wherein said encrypted frame contents are read out of the second memory means in response to completion of a data processing operation.

19. A queuing system according to claim 18, wherein said data processing operation includes initialization of a decryption algorithm.

20. A queuing system according to claim 19, wherein the frame contents that are encrypted are decrypted as read out of the second memory means.

21. A queuing system according to claim 18, wherein the encrypted frame contents are periodically received by said first memory means at a rate that is higher than the rate of the data processing operation.

22. A queuing system according to claim 17, wherein said first memory means is smaller in size than said second memory means.

23. A queuing system according to claim 17, wherein said second memory means stores identifier data for identifying frame content associated with at least one of: end of a frame and frame validity.

24. A queuing system according to claim 17, wherein a key is identified and a decryption algorithm is initialized for each frame in order to perform decryption of encrypted frame content, wherein said key is identified using a header portion of a frame.

25. A queuing system according to claim 17, wherein said second memory means stores a flag indicative of at least one of: end of a frame and frame validity.

26. A queuing method comprising:
performing a data validity check for frames;
writing the frames comprised of encrypted frame contents into a first memory, wherein said first memory transmits an interrupt to an associated processor in response to completing receipt of a valid frame;
re-initializing said first memory for receipt of a subsequent frame in response to the interrupt;
transferring the encrypted frame contents from the first memory to a second memory wherein the second memory is adapted to concurrently store a plurality of frames; and
decrypting the encrypted frame contents received from the second memory in response to the data validity check;
searching for a key for decrypting the encrypted frame contents while the encrypted frame contents are being transferred from the first memory to the second memory.

27. A queuing method according to claim 26, wherein said encrypted frame contents are read out of the second memory in response to completion of a data processing operation.

28. A queuing method according to claim 27, wherein said data processing operation includes a step of initializing a decryption algorithm.

29. A queuing method according to claim 28, wherein said method further comprises decrypting encrypted frame contents when read out of said second memory.

30. A queuing method according to claim 27, wherein the encrypted frame contents are periodically received by said first memory at a rate that is higher than the rate of the data processing operation.

31. A queuing method according to claim 26, wherein said first memory is smaller in size than said second memory.

32. A queuing method according to claim 26, wherein said second memory stores identifier data for identifying frame content associated with at least one of: end of a frame and frame validity.

33. A queuing method according to claim 26, wherein a key is identified and a decryption algorithm is initialized for each frame in order to perform decryption of encrypted frame content, wherein said key is identified using a header portion of a frame.

34. A queuing method according to claim 26, wherein said second memory stores a flag indicative of at least one of: end of a frame and frame validity.

* * * * *